United States Patent
Ikawa et al.

(10) Patent No.: US 6,617,383 B2
(45) Date of Patent: Sep. 9, 2003

(54) THERMOPLASTIC ELASTOMER COMPOSITION HAVING IMPROVED PROCESSABILITY AND TIRE USING THE SAME

(75) Inventors: Masahiro Ikawa, Hiratsuka (JP); Kazuto Yamakawa, Hiratsuka (JP); Yuichi Hara, Hiratsuka (JP); Daisuke Kanenari, Hiratsuka (JP); Katsuhiro Tanaka, Hiratsuka (JP); Yoshihiro Soeda, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/812,949

(22) Filed: Mar. 27, 2001

(65) Prior Publication Data

US 2001/0041762 A1 Nov. 15, 2001

(30) Foreign Application Priority Data

Apr. 11, 2000 (JP) ........................................ 2000-115814
Jul. 4, 2000 (JP) ........................................ 2000-202652

(51) Int. Cl.$^7$ ................................................. C08K 5/41
(52) U.S. Cl. ........................................ 524/167; 524/306
(58) Field of Search ................................. 524/167, 306

(56) References Cited

U.S. PATENT DOCUMENTS

| | | |
|---|---|---|
| 4,130,534 A | 12/1978 | Coran et al. |
| 4,197,379 A | 4/1980 | Coran et al. |
| 5,910,544 A | 6/1999 | Ozawa et al. |

FOREIGN PATENT DOCUMENTS

| | | |
|---|---|---|
| EP | 0 633 152 A1 | 1/1995 |
| EP | 0 722 850 A1 | 7/1996 |
| EP | 0 969 039 A1 | 1/2000 |

OTHER PUBLICATIONS

Database WPI; Section Ch., Week 200010, Derwent Publication Ltd., London, GB; AN 2000–111747, XP002172817 & JP 11 349734 A (Yokohama Rubber Co., Ltd.), Dec. 21, 1999, Abstract.
Database WPI; Section Ch., Week 200016, Derwent Publications Ltd., London, GB; AN 2000–177135, XP002172818 & JP 2000 026720 A (Yokohama Rubber Co., Ltd.), Jan. 25, 2000, Abstract.

Primary Examiner—Edward J. Cain
(74) Attorney, Agent, or Firm—Arent Fox Kintner Plotkin & Kahn, PLLC

(57) ABSTRACT

A thermoplastic elastomer composition of a structure of a thermoplastic resin (A) in which a rubber composition (B) is dispersed, where the stress at the time of 2.5% elongation of the stress-strain curve of the thermoplastic elastomer composition is 0.1 to 50 MPa and the ratio of the stress ($M_{200}$) at −20° C. and 200% elongation and the stress ($M_{100}$) at −20° C. and 100% elongation is $1.0<M_{200}/M_{100}<2.0$, particularly a thermoplastic elastomer composition structured with the polyamide resin of the thermoplastic resin (A) in which the rubber composition (B) is dispersed, includes a polyamide plasticizer (C1) and/or a thermoplastic elastomer (C2), the ratio of composition being (A) 15 to 59% by weight, (B) 40 to 70% by weight (C1+C2), and 1 to 30% by weight and a tire using the same.

13 Claims, 1 Drawing Sheet

THERMOPLASTIC ELASTOMER COMPOSITION HAVING IMPROVED PROCESSABILITY AND TIRE USING THE SAME

BACKGROUND OF THE INVENTION

1. Field of the Invention

The present invention relates to a thermoplastic elastomer composition. More specifically, it relates to a thermoplastic elastomer composition superior in processability and dynamic fatigue resistance even under a low temperature such as −20° C. and also to a tire, particularly a tire suitable for use in a cold area, using the same as a tire member.

2. Description of the Related Art

To improve the dynamic fatigue resistance, while maintaining a balance between the flexibility and the gas permeation resistance, it is known from Japanese Unexamined Patent Publication (Kokai) No. 8-259741 that a nylon resin and a rubber component are formed into a thermoplastic elastomer composition by dynamic vulcanization, which is then used for an air permeation preventive layer (e.g., inner liner). However, there was the problem that the thermoplastic elastomer composition was not sufficient in dynamic fatigue resistance at a low temperature such as −20° C. and, therefore, was not necessarily suitable for use, as a tire, in a cold area.

SUMMARY OF THE INVENTION

Accordingly, an object of the present invention is to provide a thermoplastic elastomer composition superior in dynamic fatigue resistance even under a low temperature such as −20° C. and a cold region tire using this composition as a tire member.

Other objects and advantages of the present invention will be apparent from the following description.

In accordance with the present invention, there is provided a thermoplastic elastomer composition comprising a thermoplastic resin (A) and a rubber composition (B) dispersed in the thermoplastic resin (A), wherein a stress at the time of 2.5% elongation in a stress-strain curve of the thermoplastic elastomer composition is 0.1 to 50 MPa and a ratio of the stress ($M_{200}$) at −20° C. and 200% elongation and the stress ($M_{100}$) at −20° C. and 100% elongation is $1.0 < M_{200}/M_{100} < 2.0$.

In accordance with the present invention, there is also provided the above thermoplastic elastomer composition, wherein the value of the first order differential of the stress-strain curve of the thermoplastic elastomer composition monotonously decreases in a 2 to 20% strain region.

In accordance with the present invention, there is further provided the above thermoplastic elastomer composition, wherein an air permeation coefficient at 30° C. of the thermoplastic elastomer composition is more than $25 \times 10^{-12}$ cc·cm/cm²·sec·cmHg and not more than $100 \times 10^{-12}$ cc·cm/cm²·sec·cmHg and a Young's modulus at −20° C. is not more than 250 MPa.

In accordance with the present invention, there is still further provided the above thermoplastic elastomer composition, wherein the thermoplastic resin (A) is a polyamide resin having the rubber component (B) dispersed therein, at least one member selected from the group consisting of polyamide plasticizer (C1) and thermoplastic elastomers (C2) is contained in the composition and a ratio of the components, where the total is made 100% by weight, is as follows:

(A) polyamide resin: 15 to 59% by weight,
(B) rubber composition: 40 to 70% by weight, and
(C) polyamide thermoplastizer+thermoplastic elastomer (C1+C2): 1 to 30% by weight.

In accordance with the present invention, there is still further provided the above thermoplastic elastomer composition, wherein the elongation at break at −20° C. is not less than 300%, the Young's modulus at −20° C. is in a range not more than 250 MPa, and the product of the elongation at break and the Young's modulus is 10,000 to 100,000 (%·MPa).

In accordance with the present invention, there is still further provided the above thermoplastic elastomer composition, wherein the ratio, by weight, of composition of the components satisfies the following relation:

$$1.0 \leq (B+C2)/(A+C1) \leq 2.5$$

In accordance with the present invention, there is still further provided a tire using the thermoplastic elastomer composition.

BRIEF DESCRIPTION OF THE DRAWINGS

The present invention will be better understood from the description set forth below with reference to the accompanying drawings, wherein.

DESCRIPTION OF THE PREFERRED EMBODIMENTS

Figure 1:
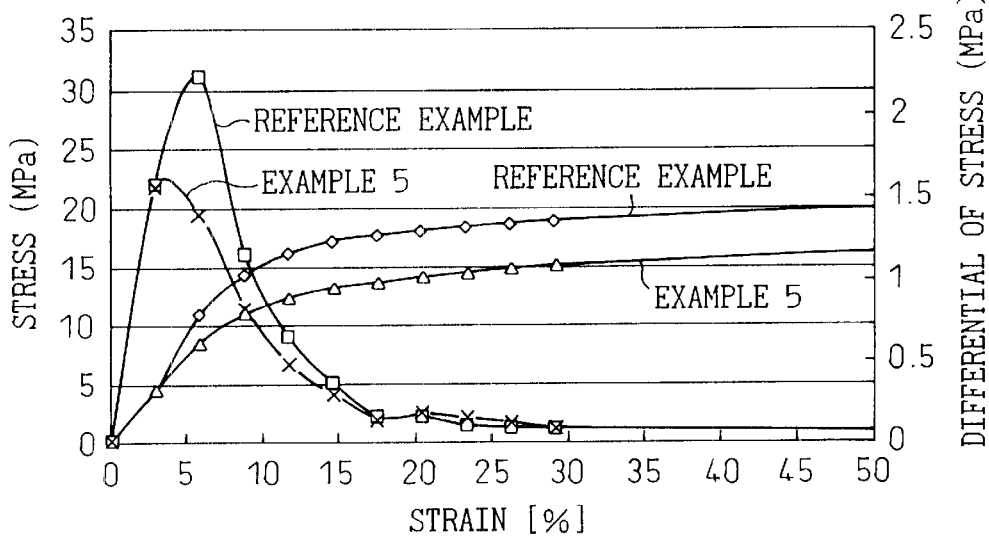
FIG. 1 is a graph of a stress-strain curve at a strain of 0 to 30% of Example 5 of the present invention and a Reference Example and a partial differential curve of the same.
Figure 2:
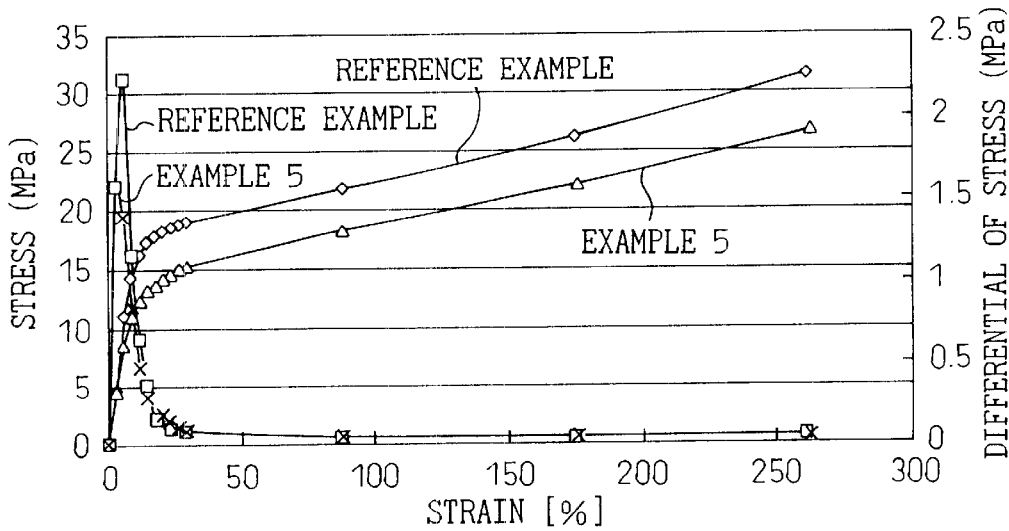
FIG. 2 is a graph of a stress-strain curve at a strain of 0 to 25% of Example 5 of the present invention and a reference example and a partial differential curve of the same.

The present invention will now be explained in more detail. In this specification and in the claims, the singular forms "a", "an" and "the" include plural referents unless the context clearly dictates otherwise.

According to the present invention, a thermoplastic elastomer composition having a structure of a thermoplastic resin (A) in which a rubber composition (B) is dispersed, wherein the stress at a 2.5% elongation in the stress-strain curve of the thermoplastic elastomer composition is 0.1 to 50 MPa, preferably 0.1 to 40 MPa, and the ratio of the stress ($M_{200}$) at −20° C. and 200% elongation and the stress ($M_{100}$) at −20° C. and 100% elongation is $1.0 < M_{200}/M_{100} < 2.0$, preferably $1.1 < M_{200}/M_{100} < 1.8$, has a superior dynamic fatigue resistance under a low temperature such as −20° C. Particularly, in a thermoplastic elastomer composition of a structure, wherein the value of the first order differential of the stress-strain curve of the thermoplastic elastomer composition monotonously decreases in a 2 to 20%, preferably 2 to 18%, strain region, the dynamic fatigue resistance under a low temperature becomes much better.

The thermoplastic elastomer composition according to the present invention typically has an air permeation coefficient at 30° C. of more than $25 \times 10^{-12}$ cc·cm/cm²·sec·cmHg and not more than $100 \times 10^{-12}$ cc·cm/cm²·sec·cmHg preferably $25 \times 10^{-12}$ cc·cm/cm²·sec·cmHg to $90 \times 10^{-12}$ cc·cm/cm²·sec·cmHg, and a Young's modulus at −20° C. of not more than 250 MPa, preferably not more than 230 MPa.

According to the present invention, the thermoplastic elastomer composition has a processing aid blended therein within a limited range, whereby the Young's moduls at −20° C. falls and the dynamic fatigue resistance is strikingly improved.

In a preferable thermoplastic elastomer composition according to the present invention, a polyamide resin is used for the thermoplastic resin (A), a halogen-containing copolymer rubber derived from $C_4$ to $C_7$ isomonoolefin/p-alkylstyrene is used for the rubber composition (B), and the rubber component is uniformly blended as a dispersed phase (i.e., domain) in the continuous phase (i.e., matrix) composed of the thermoplastic resin.

The polyamide resin component (A) effectively usable in the thermoplastic elastomer composition include, for example, Nylon 6 (N6), Nylon 66 (N66), Nylon 11 (Nil), Nylon 12 (N12), Nylon 6/66 copolymer (N6/N66), Nylon 46 (N46), Nylon 610 (N610), Nylon 612 (N612), Nylon 6/66/610 copolymer (N6/66/610), Nylon MXD6 (MXD6), Nylon 6T, Nylon 6/6T copolymer, Nylon 66/PP copolymer, Nylon 66/PPS copolymer, a polyester-based resin (e.g., polybutylene terephthalate (PBT), polyethylene terephthalate (PET), polyethylene isophthalate (PEI), PET/PEI copolymer, polyacrylate (PAR), polybutylene naphthalate (PBN), liquid crystal polyester, polyoxyalylene diimidic acid/polybutyrate terephthalate copolymer, and other aromatic polyesters), a polynitrile-based resin (e.g., polyacrylonitrile (PAN), polymethacrylonitrile, acrylonitrile/styrene copolymer (AS), methacrylonitrile/styrene copolymer, and methacrylonitrile/styrene/butadiene copolymer), a polymethacrylate-based resin (e.g., polymethyl methacrylate (PMMA) and polyethyl methacrylate), a polyvinyl-based resin (e.g., vinyl acetate (EVA), polyvinyl alcohol (PVA), vinyl alcohol/ethylene copolymer (EVOH), polyvinyl vinylidene chloride (PVDC), polyvinyl chloride (PVC), polyvinyl chloride/vinylidene chloride copolymer, and vinylidene chloride/methylacrylate copolymer), a cellulose-based resin (e.g., cellulose acetate, cellulose acetate butyrate), a fluororesin (e.g., polyvinylidene fluoride (PVDF), polyvinyl fluoride (PVF), polychlorofluoroethylene (PCTFE), and tetrafluoroethylene/ethylene copolymer (ETFE)), an imide-based resin (e.g., aromatic polyimide (PI)), etc. alone or in any combination thereof. This component is used in an amount of 15 to 59% by weight, preferably 20 to 59% by weight, in the thermoplastic elastomer composition of the present invention.

The rubber component of the rubber composition (B) according to the present thermoplastic elastomer composition includes a diene-based rubber and its hydrates (e.g., NR, IR, epoxylated natural rubber, SBR, BR (high cis BR and low cis BR), NBR, hydrogenated NBR, and hydrogenated SBR), an olefin-based rubber (e.g., ethylene propylene rubber (EPDM and EPM), a maleic acid modified ethylene propylene rubber (M-EPM), IIR, an isobutylene and aromatic vinyl or diene-based monomer copolymer, an acryl rubber (ACM), ionomer), a halogen-based rubber (e.g., Br-IIR, Cl-IIR, a bromide of isobutylene p-methylstyrene copolymer (Br-IPMS), a chloroprene rubber (CR), a hydrin rubber (CHR), a chlorosulfonated polyethylene (CSM), a chlorinated polyethylene (CM), a maleic acid modified chlorinated polyethylene (M-CM), a silicone rubber (e.g., methylvinyl silicone rubber, dimethyl silicone rubber, and methylphenylvinyl silicone rubber), a sulfur-containing rubber (e.g., polysulfide rubber), a fluororubber (e.g., vinylidene fluoride based rubber, fluorine-containing vinyl ether-based rubber, tetrafluoroethylene-propylene-based rubber, fluorine-containing silicone-based rubber, and fluorine-containing phosphagen-based rubber), a thermoplastic elastomer (e.g., styrene-based elastomer, olefin-based elastomer, ester-based elastomer, urethane-based elastomer, polyamide-based elastomer), etc. may be used, in particular an isobutylene-isoprene copolymer rubber with a halogen group introduced as a modified polyisobutylene-based rubber and/or a halogen-containing copolymer rubber of isomonoolefin and p-alkylstyrene such as an isostyrene-p-methylstyrene copolymer rubber. For the latter, Exxon's "Exxpro" may be suitably used. These rubber components are used in amounts of 40 to 70% by weight, preferably 40 to 65% by weight, as a rubber composition in the thermoplastic elastomer composition of the present invention.

Further, the polyamide plasticizer (C1) blended into the thermoplastic elastomer composition according to the present invention, which is capable of imparting processability and desired low temperature characteristics includes nylon plasticizers (C1) such as N-ethyl toluene sulfonamide, N-cyclohexyl toluene sulfonamide, N-butylbenzene sulfonamide, and other sulfonamide-based compounds. As commercial products, for example, BM-4 made by Daihachi Chemical Industry is suitably used. Further, as a nylon plasticizer other than a sulfonamide-based compound, there are a p-oxybenzoate octyl ester, dimethyl phthalate, triphenyl phosphate, glycerin, hexyl glycol, a modified urethane prepolymer having an weight average, molecular weight of 400 to 2000, preferably 600 to 1000, and so on.

Further, examples of the thermoplastic elastomer (C2) according to the present invention are a polyester-polyether type polymer composed of an aromatic crystalline polyester (e.g., polybutylene terephthalate: PBT) as a hard segment and a polyether (e.g., polytetramethylene ether glycol: PTMG) as a soft segment, a polyester-polyester type polymer comprised of an aromatic crystalline polymer (e.g., polybutylene terephthalate: PBT) as a hard segment and an aliphatic polyester (e.g., polylactone) as a soft segment, a liquid crystalline polymer comprised of a low molecular liquid crystal compound (e.g., dihydroxy p-guarter phenyl: DHQ) as a hard segment and an aliphatic polyester as a soft segment, or another polyether elastomer may be used. As commercial products, Dupont's "Hytrel", Toyobo's "Perprene", etc. may be suitably used. In addition, a so-called engineering plastic-based thermoplastic elastomer, for example, a urethane-based thermoplastic elastomer (TPU), polyester-based thermoplastic elastomer (TPEE), polyamide-based thermoplastic elastomer (TPA), fluorine-based thermoplastic elastomer, and other thermoplastic elastomers (C2) may be mentioned.

The processing aid (C) may be used in a total amount of 1 to 30% by weight, preferably 1 to 28% by weight, in the thermoplastic elastomer composition of the present invention both in the case of use alone or in any combination thereof.

The rubber component in the thermoplastic elastomer composition according to the present invention preferably having general amounts of a predetermined conventional rubber compounding agents such as zinc oxide, stearic acid, vulcanization agent, vulcanization accelerator previously blended therein is preferably used as the rubber composition.

The thermoplastic elastomer composition of the present invention may have the necessary amounts conventional compounding agents generally blended into an elastomer, such as a reinforcing agent, filler, cross-linking agent, softener, antiaging agent, processing aid, in order to improve the dispersibility and heat resistance of the elastomer.

The thermoplastic elastomer composition according to the present invention is preferably composed of a halogen-containing copolymer rubber of a $C_4$ to $C_7$ isomonoolefin/p-alkylstyrene, the nylon plasticizer (C1) is a sulfonamide compound, and the thermoplastic elastomer (C2)) is a polyester elastomer, to obtain the desired low temperature properties. Further, it is preferably made a thermoplastic elastomer composition wherein the elongation at break at −20° C. and the Young's modulus are at least 300%, preferably 300 to 500%, and not more than 250 MPa, preferably not more than 200 MPa, and wherein the product of the elongation at break and the Young's modulus is 10,000 to 100,000 (%·MPa), preferably 10,000 to 90,000 (%·MPa). Further, it is preferably made a thermoplastic elastomer composition where the ratio of composition of the components is $1.0 \leq (B+C2)/(A+C1) \leq 2.5$, more preferably $1.0 \leq (B+C2)/(A+C1) \leq 2.4$.

The thermoplastic elastomer composition according to the present invention may contain, in addition to the above essential components, other polymer such as a compatibilizer polymer blended therewith to an extent not impairing the necessary properties of the elastomer composition. The polymer material usable includes, for example, polyethylene (PE), polypropylene (PP), ethylene ethyl acrylate (EEA), ethylene vinyl acetate (EVA), and their modified products (anhydrous maleic acid, epoxy, carboxyl, hydroxyl group, or other graft polymers), polystyrene (PS), ABS, SBS, polycarbonate (PC), etc. The compatibilizer is not particularly limited so long as the predetermined action and effect are not adversely affected.

The thermoplastic elastomer composition according to the present invention may be produced by, for example, the following procedure.

First, the rubber component and a predetermined cross-linking agent are mixed in advance using a general kneader such as Bambury mixer, etc. until a uniformly mixed state is obtained. At that time, the rubber component may contain, therein, fillers such as carbon black, an oil, calcium carbonate, in suitable amounts. Further, during the mixing, if the temperature of the material is too high, the rubber component undergoes a cross-linking reaction in the kneader, and therefore, the temperature has to be at a low temperature of not more than 120° C., during the mixing.

The rubber composition containing the cross-linking agent prepared in this way and the predetermined polyamide resin and processing aid (e.g., nylon plasticizer and/or thermoplastic elastomer) are charged into the twin-screw kneader etc. and the rubber component is dynamically cross-linked during the melt mixing to disperse the rubber composition as a dispersed phase (i.e., domain) in the polyamide resin forming the continuous phase (i.e., matrix).

Further, the polyamide resin or the various types of compounding agents in the rubber composition, other than the vulcanization system, may be added during the mixing, but preferably they are premixed before the mixing. A twin-screw kneader/extruder is preferably used for the mixing of the polyamide resin and the rubber composition and for the dynamic vulcanization of the rubber composition. A condition of the melt mixing is that the temperature be at least the temperature where a predetermined nylon resin melts. Further, the shearing speed at the time of mixing is preferably 500 to 7500 $\sec^{-1}$. The overall mixing time is preferably 30 seconds to 10 minutes.

The thermoplastic elastomer composition according to the present invention is superior in processability and has the above phase structure, and therefore, is superior in dynamic fatigue resistance at a low temperature of −20° C., while maintaining a balance of the flexibility and air permeation resistance. Thus, the present thermoplastic elastomer is extremely useful as a tire for a cold region when used as an inner liner.

EXAMPLES

The present invention will now be explained in further detail by Examples and Comparative Examples, but is by no means limited to the following Examples.

Reference Example, Examples 1 to 13, and Comparative Examples 1 to 3

The formulations of the rubber composition 1 (B) and the rubber composition 2 (B) used in the Examples are as follows:

Rubber Composition 1

| Formulation | Parts by weight |
| --- | --- |
| Modified butyl isobutylene p-methylstyrene copolymer (commercial name: EXXPRO 89-4, made by Exxon) | 100 |
| Zinc oxide (Zinc White No. 3, made by Seido Chemical Industry) | 0.15 |
| Stearic acid (made by Nihhon Yushi) | 0.60 |
| Zinc stearate (made by Seido Chemical Industry) | 0.30 |

Rubber Composition 2

| Formulation | Parts by weight |
| --- | --- |
| Nitrile rubber (commercial name: Nipol 1042, made by Nippon Zeon) | 100 |
| Zinc oxide (Zinc oxide No. 3, made by Seido Chemical Industry) | 5 |
| Stearic acid (made by NOC) | 1 |
| Sulfur (made by Karuizawa Refinery) | 1.5 |
| Vulcanization accelerator MBTS (commercial name: Noccelar DM, made by Ouchi Shinko Chemical) | 1 |

The above rubber compositions 1 and 2 (i.e., master batches) were prepared using internal mixers.

These master batches were used and mixed and pelletized by a twin-screw kneader in the formulations (parts by weight) shown in Table I.

The characteristics of the Examples were determined by the following methods. The results are shown in Table I.

1) Elongation at Break and Young's Modulus

A film of a thermoplastic elastomer having a width of 350 mm and a thickness of 0.3 mm was prepared by a T-die extruder.

The elongation at break and the Young's moduls of the film thus obtained was measured. The test was conducted by punching out a JIS dumbbell shaped No. 3 sample from the sheet based on JIS K6251 and applying tension at a tensile rate of 500 mm/min. The method was based on JIS K7161.

2) Constant Strain Fatigue Test

A film of a thermoplastic elastomer having a width of 350 mm and a thickness of 0.1 mm was prepared by a T-die extruder. Further, an adhesive shown below was extruded by a T-die extruder to a thickness of 30 μm and laminated on the film.

Formulation of Adhesive

| Formulation | Parts by weight |
|---|---|
| Epoxy modified SBS*1 | 80 |
| Rosin ester*2 | 20 |
| Peroxide*3 | 5 |

*1: Epoxy-modified SBS (ESBS ATO15, made by Daicel Chemical Industries)
*2: Rosin ester (Pencell AD, made by Arakawa Chemical Industries)
*3: Peroxide (Perkadox 14-40, made by Kayaku Akzo)

The laminated film with the adhesive prepared in this way and a sheet of the rubber composition of the formulation shown below mixed by an internal mixer and then formed into a sheet having a thickness of 2 mm by an open roll were clad together so that the adhesive side of the laminate film contacted the rubber sheet. The laminated sheet was pressed at 190° C. for 10 minutes to obtain a laminate for test use.

Rubber Composition

| Formulation | Parts by weight |
|---|---|
| Natural rubber*1 | 80 |
| SBR1502*2 | 20 |
| FEF carbon black*3 | 50 |
| Stearic acid*4 | 2 |
| Zinc oxide*5 | 3 |
| Sulfur*6 | 3 |
| Vulcanization accelerator (NS)*7 | 1 |
| Aromatic oil*8 | 2 |

*1: Natural rubber (RSS#1)
*2: SBR1502 (Nipol 1502, made by Nippon Zeon)
*3: FEF carbon black (HTC100, made by Chubu Carbon)
*4: Stearic acid (Lunac YA, made by Kao Soap)
*5: Zinc oxide (Ginrei Zinc oxide, made by Toho Zinc)
*6: Sulfur (powdered sulfur, made by Karuizawa Refinery)
*7: Vulcanization accelerator (NS) (Noccelar NS-P, made by Ouchi Shinko Chemical)
*8: Aromatic oil (Koumorex 300, made by Nippon Petrochemicals)

The test laminate thus obtained was punched to a JIS dumbbell shaped No. 2 sample (JIS K6251), then the dumbbell shaped sample was mounted on a fatigue tester and tested for constant strain fatigue. The test was conducted with a chuck distance of 54 mm, a tensile strain rate of 40%, a repeated tensile frequency of 6.67 Hz, and a test temperature of −20° C. The test was finished when fissures appeared in the thermoplastic elastomer film of the sample of the surface.

The judgment was made designating a number of repetitions until fissures appeared of at least 5 million cycles as "good" and a number of at least 7.5 million cycles as "very good". A number of less than 5 million cycles was designated as "poor".

3) Tire Evaluation

The laminate film with the adhesive was wound around the tire shaping drum so that the surface of the thermoplastic elastomer contacted the drum. The tire members such as carcass, side tread, captread were laid thereon and the assembly inflated to produce a green tire. The green tire was then vulcanized by a vulcanizer at 180° C. for 10 minutes to obtain the finished steel radial tire having a tire size of 175/80R14. This was tested for tire durability.

The test was conducted using a rim size of 14×5.5 J, applying an internal pressure of 175 kPa, and running with a load of 4.5 kN at a temperature of −20° C. and a speed of 80 km/h on a 1707 mm diameter drum for 10,000 km, then examining the inside surface of the tire.

The evaluation was made by visual observation of the inner liner layer. Samples where the following faults were found were judged as "poor" and samples where none faults were found were judged as "good".

(1) Samples with fissures and cracks
(2) Samples with peeling and blistering

TABLE I

| | Ref. Ex. | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Formulation | | | | | | | | | |
| Rubber composition 1 (B) | 50 | 50 | 50 | 48 | 61 | 56 | 53 | 50 | 54 |
| Rubber composition 2 (B) | 0 | 0 | 0 | 0 | 0 | 0 | 0 | 0 | 0 |
| Copolymer nylon (A)*1 | 18 | 17 | 15 | 16 | 13 | 13 | 25 | 11 | 11 |
| Nylon 11 (A)*2 | 32 | 25 | 24 | 23 | 20 | 20 | 11 | 21 | 17 |
| Polyester elastomer (C2)*3 | 0 | 0 | 0 | 0 | 0 | 0 | 0 | 3 | 7 |
| Polyamide elastomer (C2)*4 | 0 | 0 | 0 | 0 | 0 | 0 | 0 | 0 | 0 |
| N-butylbenzene sulfonamide (C1)*5 | 0 | 3 | 6 | 8 | 6 | 5 | 6 | 12 | 5 |
| Dibutyl phthalate*6 | 0 | 0 | 0 | 0 | 0 | 0 | 0 | 0 | 0 |
| Compatibilizer*7 | 0 | 5 | 5 | 5 | 0 | 6 | 5 | 5 | 5 |
| Characteristics | | | | | | | | | |
| L: −20° C. elongation at break (%) | 385 | 418 | 421 | 405 | 451 | 449 | 389 | 398 | 485 |

TABLE I-continued

|  | | | | | | | | |
|---|---|---|---|---|---|---|---|---|
| E: -20° C. Young's modulus (MPa) | 155.6 | 120.5 | 110.8 | 70.6 | 70.3 | 90.3 | 99.7 | 96.3 | 55.4 |
| L×E (% · MPa) | 59906 | 50369 | 46647 | 28593 | 31705 | 40545 | 38783 | 38327 | 26869 |
| (B + C2)/(A + C1) | 1.0 | 1.11 | 1.11 | 1.02 | 1.56 | 1.47 | 1.26 | 1.20 | 1.85 |
| 2.5% elongation stress (MPa) | 4.16 | 2.98 | 2.93 | 2.77 | 2.45 | 2.49 | 2.85 | 2.45 | 2.08 |
| $M_{100}$ (-20° C.) (MPa) | 20.8 | 14.9 | 14.7 | 13.9 | 12.2 | 12.5 | 14.2 | 12.2 | 10.4 |
| $M_{200}$ (-20° C.) (MPa) | 23.4 | 22.6 | 22.0 | 19.8 | 19.1 | 19.4 | 21.0 | 19.1 | 16.8 |
| $M_{200}/M_{100}$ | 1.13 | 1.52 | 1.50 | 1.43 | 1.56 | 1.56 | 1.48 | 1.56 | 1.61 |
| Constant strain value (10,000 times) | 360 | 782 | 960 | 1284 | 918 | 1199 | 1172 | 637 | 990 |
| Judgment | Poor | V.good | V.good | V.good | V.good | V.good | V.good | Good | V.good |
| Tire evaluation | Poor | Good | Good | Good | Good | Good | Good | Good | Good |

| | Ex. 9 | Ex. 10 | Ex. 11 | Ex. 12 | Ex. 13 | Comp. Ex. 1 | Comp. Ex. 2 | Comp. Ex. 3 |
|---|---|---|---|---|---|---|---|---|
| Formulation | | | | | | | | |
| Rubber composition 1 (B) | 61 | 54 | 0 | 57 | 45 | 38 | 75 | 45 |
| Rubber composition 2 (B) | 0 | 0 | 56 | 0 | 0 | 0 | 0 | 0 |
| Copolymer nylon (A)*1 | 0 | 12 | 13 | 11 | 18 | 27 | 8 | 10 |
| Nylon 11 (A)*2 | 23 | 17 | 20 | 17 | 25 | 26 | 8 | 8 |
| Polyester elastomer (C2)*3 | 10 | 0 | 0 | 10 | 0 | 2 | 5 | 20 |
| Polyamide elastomer (C2)*4 | 0 | 7 | 0 | 0 | 0 | 0 | 0 | 0 |
| N-butylbenzene sulfonamide (C1)*5 | 0 | 5 | 5 | 0 | 8 | 3 | 2 | 12 |
| Dibutyl phthalate*6 | 0 | 0 | 0 | 5 | 0 | 0 | 0 | 0 |
| Compatibilizer*7 | 6 | 5 | 6 | 0 | 4 | 4 | 7 | 5 |
| Characteristics | | | | | | | | |
| L: -20° C. elongation at break (%) | 560 | 475 | 410 | 460 | 390 | 328 | 160 | 145 |
| B: -20° C. Young's modulus (MPa) | 45.3 | 60.5 | 105.2 | 52.6 | 110 | 201.2 | 38.6 | 42 |
| L×E (% · MPa) | 25368 | 28738 | 43132 | 24196 | 42600 | 65994 | 6176 | 6090 |
| (B + C2)/(A + C1) | 3.1 | 1.8 | 1.5 | 2.4 | 0.9 | 0.7 | 4.4 | 2.2 |
| 2.5% elongation stress (MPa) | 2.0 | 3.9 | 5.0 | 3.3 | 5.0 | 6.1 | 1.5 | 1.6 |
| $M_{100}$ (-20° C.) (MPa) | 10.1 | 15.6 | 19.8 | 13.2 | 20.0 | 24.5 | 5.9 | 6.2 |
| $M_{200}$ (-20° C.) (MPa) | 11.9 | 17.1 | 21.8 | 15.0 | 22.0 | 49.5 | -*8 | -*8 |
| $M_{200}/M_{100}$ | 1.18 | 1.10 | 1.10 | 1.14 | 1.10 | 2.02 | — | — |
| Constant strain value (10,000 times) | 685 | 1026 | 550 | 726 | 583 | 160 | 60 | 50 |
| Judgment | Good | V.good | Good | Good | Good | Poor | Poor | Poor |
| Tire evaluation | Good | Good | Good | Good | Good | Poor | Poor | Poor |

Footnote of Table I
*1Commercial name (Ube Nylon 5033B, made by Ube Industries, Nylon 6/Nylon 66 copolymer)
*2Commercial name (Rilsan BMN 0, made by Atochem)
*3Commercial name (Hytrel 4777, made by Toray Dupont, melting point 195° C.)
*4Commercial name (Pebax 2533, made by Atochem, melting point 148° C.)
*5Commercial name (BM-4, made by Daihachi Chemical Industry, solidification point -26° C.)
*6Commercial name (DBP, made by Daihachi Chemical Industry, solidification point -35° C.)
*7Commercial name (AR201, made by Mitsui Dupont Polychemical, modified EEA resin)
*8Not detectable (i.e., extremely low)

As seen in the results of Table I, the thermoplastic elastomer compositions according to the present invention exhibit the actions and effects of expected superiority in dynamic fatigue resistance even at a low temperature of -20° C. and are extremely useful for use as tire members for cold areas.

What is claimed is:

1. A thermoplastic elastomer composition comprising a thermoplastic resin (A) and a rubber composition (B) dispersed in the thermoplastic resin (A) and further comprising a polyamide plasticizer (C1), a stress at the time of 2.5% elongation in a stress-strain curve of the thermoplastic elastomer composition being 0.1 to 50 Mpa and a ratio of the stress ($M_{200}$) at -20° C. and 200% elongation and the stress ($M_{100}$) at -20° C. and 100% elongation being $1.0<M_{200}/M_{100}<2.0$.

2. A thermoplastic elastomer composition as claimed in claim 1, wherein a value of a first order differential of the stress-strain curve of the thermoplastic elastomer composition monotonously decreases in a 2 to 20% strain region.

3. A thermoplastic elastomer composition as claimed in claim 1, wherein an air permeation coefficient at 30° C. of the thermoplastic elastomer composition is more than $25 \times 10^{-12}$ cc·cm/cm²·sec·cmHg and not more than $100 \times 10^{-12}$ cc·cm/cm²·sec·cmHg and a Young's modulus at -20° C. is not more than 250 MPa.

4. A thermoplastic elastomer composition as claimed in claim 1, wherein the thermoplastic resin (A) is a polyamide resin having the rubber component (B) dispersed therein and a thermoplastic elastomer (C2) is optionally contained in the composition and a ratio of the components, where the total is made 100% by weight, is as follows:

(A) polyamide resin: 15 to 59% by weight,
(B) rubber composition: 40 to 70% by weight, and
(C) polyamide plasticizer (C1)+thermoplastic elastomer (C2): 1 to 30% by weight.

5. A thermoplastic elastomer composition as claimed in claim 4, wherein the polyamide plasticizer (C1) is a sulfonamide compound and the thermoplastic elastomer (C2) is a polyester elastomer.

6. A thermoplastic elastomer composition as claimed in claim 4, wherein the elongation at break at -20° C. is not less than 300%, the Young's modulus at -20° C. is not more than 250 MPa, and the product of the elongation at break and the Young's modulus is 10,000 to 100,000 (%·MPa).

7. A thermoplastic elastomer composition as claimed in claim 4, wherein the ratio, by weight, of the components satisfies the following relation:

$$1.0 \leq (B+C2)/(A+C1) \leq 2.5.$$

8. A tire comprising a thermoplastic elastomer composition according to claim 1 or 4.

9. A tire comprising an inner liner formed from a thermoplastic elastomer composition according to claim 1 or 4.

10. A thermoplastic elastomer composition as claimed in claim 1, wherein said rubber component (B) is at least one elastomer selected from the group consisting of diene-based rubbers and the hydrates thereof, olefin-based rubbers, halogen-containing rubbers, silicone rubbers, sulfur-containing rubbers, fluororubbers, and thermoplastic elastomers.

11. A thermoplastic elastomer composition as claimed in claim 1, wherein a solidification point of the polyamide plasticizer is not more than $-20°$ C.

12. A thermoplastic elastomer composition as claimed in claim 1, wherein the elastomer component (B) is a halogen-containing copolymer rubber derived from a $C_4$ to $C_7$ isomonoolefin and p-alkylstyrene, the content of the p-alkylstyrene is 5.5 to 25% by weight and the halogen content is not less than 1.0% by weight.

13. A thermoplastic elastomer composition as claimed in claim 1, wherein the polyamide plasticizer (C1) is a sulfonamide compound.

* * * * *